Figure 1:
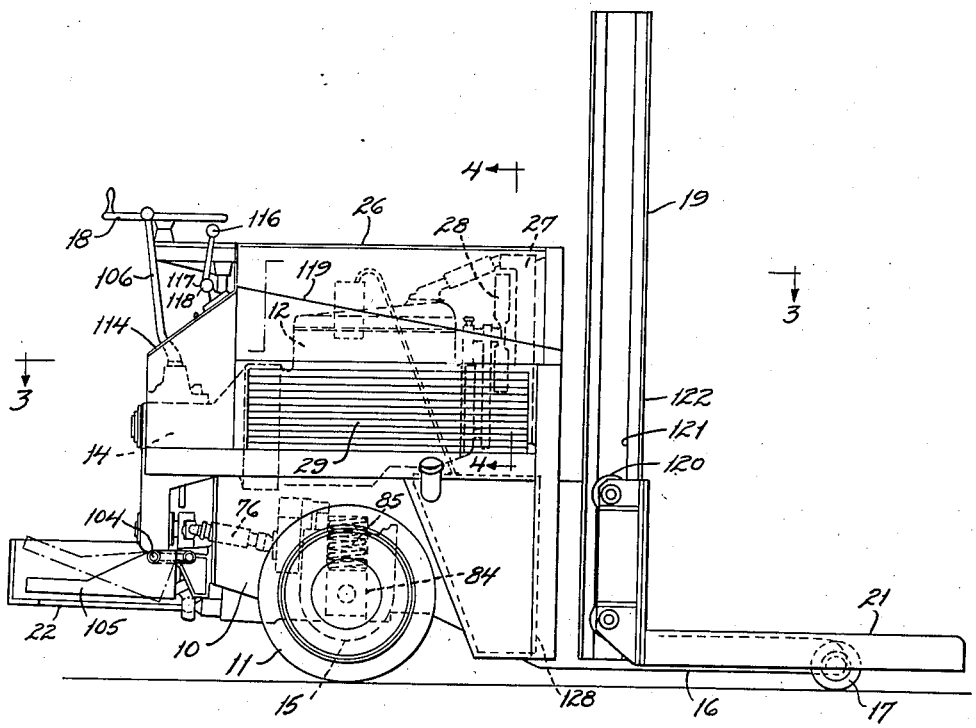

April 12, 1938.  S. K. TOWSON  2,114,156
INDUSTRIAL TRUCK
Filed April 25, 1936    4 Sheets-Sheet 4

INVENTOR.
Sheldon K. Towson
BY Bates, Goldrick & Teare
ATTORNEYS.

Patented Apr. 12, 1938

2,114,156

UNITED STATES PATENT OFFICE 2,114,156

INDUSTRIAL TRUCK

Sheldon K. Towson, Cleveland Heights, Ohio, assignor to The Elwell-Parker Electric Company, Cleveland, Ohio, a corporation of Ohio Application April 25, 1936, Serial No. 76,372

9 Claims. (Cl. 214—65)

The present invention relates to an industrial truck, and especially to an industrial truck having an improved driving and power mechanism including an internal combustion engine, such mechanism being compactly arranged, readily accessible and comparatively simple, to the end that the truck may be manufactured at a comparatively low cost, without increasing its size or diminishing its ruggedness or efficiency.

Industrial trucks for handling loads and transporting them from place to place in manufacturing establishments are comparatively well known at the present time. Such trucks generally comprise a relatively short frame, supporting a power unit, at the forward end, and having at its rearward end a low-slung load-engaging member such as a platform adapted to engage a load resting comparatively close to the truck-supporting surface, to raise such load and then transport it to a new location, finally depositing the load adjacent the truck-supporting surface at such location.

In the past, considerable effort has been made to decrease the overall length and width of trucks of this general type, to enable such trucks to be turned in comparatively narrow aisleways or corridors, and operate in buildings despite obstacles, such as machinery, building supports, etc., found therein. In the past, industrial trucks have generally been powered by electricity through the medium of storage batteries and electric motors. At the present time there exists an increasing demand for trucks powered by internal combustion engines using gasoline, for instance, as a fuel. This demand is due to several conditions. For instance, the vast increase in use of automotive passenger vehicles, has enabled industrial establishments to obtain employees who are familiar with internal combustion engine powered vehicles, their operation and maintenance in service, whereas it is difficult to obtain employees who are even slightly familiar with the operation or maintenance of electric powered vehicles. Hence, internal combustion engine powered industrial trucks, in most instances, are more adaptable for use by new employees than electric power units both from the standpoint of operation and maintenance, i. e. servicing and repairing.

In the past, little attention was paid to ventilation of buildings for industrial use, whereas today the ventilation of such buildings is highly developed. Hence, it has become safe to use internal combustion engine driven units in plants, whereas, previously, the fumes resulting from the operation of said units would have made such use dangerous. Again, many advances have been made in internal combustion engines which have resulted in minimizing danger resulting from their use.

Another advantage of internal combustion motors as a source of power for industrial trucks arises from the fact that when it is desirable to transport unusually heavy loads in electric powered trucks, it has been found that either the storage space required for electric storage batteries must be increased in size or the batteries must be frequently charged. It has been found, however, that internal combustion motors can be readily constructed to deliver the power required, which in contrast to electric systems require little space for the storage of the fuel, inasmuch as a relatively small fuel tank may be used and such tank filled speedily and at frequent intervals, without withdrawing of the truck from service for any appreciable length of time.

Attempts to provide an industrial truck, powered by an internal combustion motor to meet the present demands, have presented many difficulties. Such trucks must not only be powered by an internal combustion motor, but also must have all of the advantages of the electric powered truck resulting from years of experience and research. For instance, an industrial truck powered by an internal combustion engine must, if possible, be as flexible in operation as an electrically powered truck. The power and driving units must be accessible and at the same time compactly arranged in a comparatively small space, so that the overall dimensions of the truck may be minimized, thereby enabling turning of the truck about a relatively short radius. The controls for the truck must be arranged in such a manner as to be conveniently reached by the operator while not interfering with his person, notwithstanding that the operator must stand relatively close to the truck to avoid, in effect, increasing beyond accepted limits, the overall length of the truck. The cooling system for the motor of such truck must be minimized in size and arranged and positioned so that it will not interfere with the operation of the truck or affect the comfort of the operator or interfere with his vision. Practical attainment of the above and other desiderata constitutes the general object of the present invention.

Other objects of this invention will become apparent from the following description, reference being had to the accompanying drawings, in which I illustrate a preferred form. The essential and novel features of the invention will be summarized in the claims.

Figure 2:
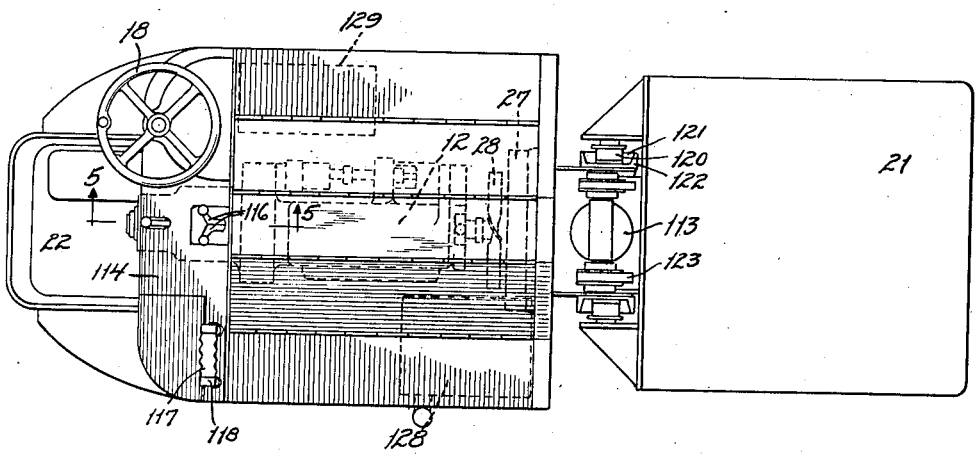
Figure 3:
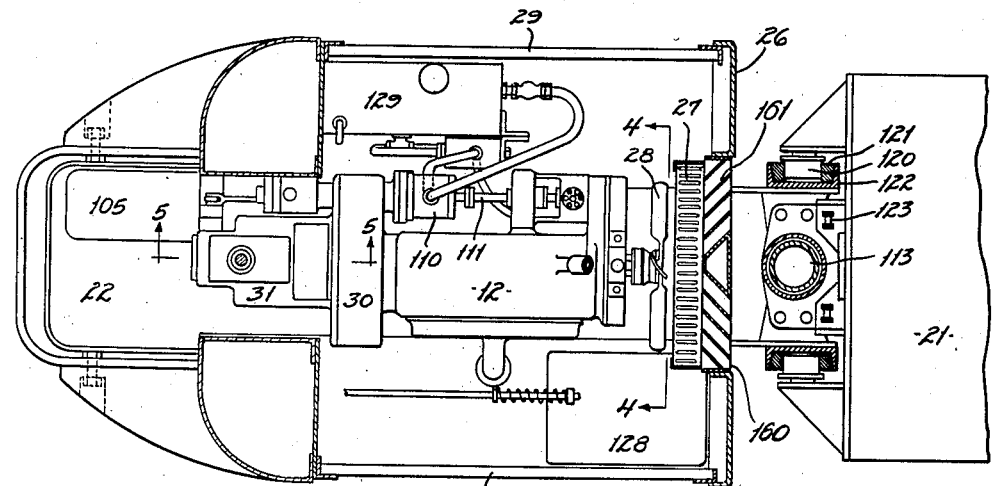
Figure 4:
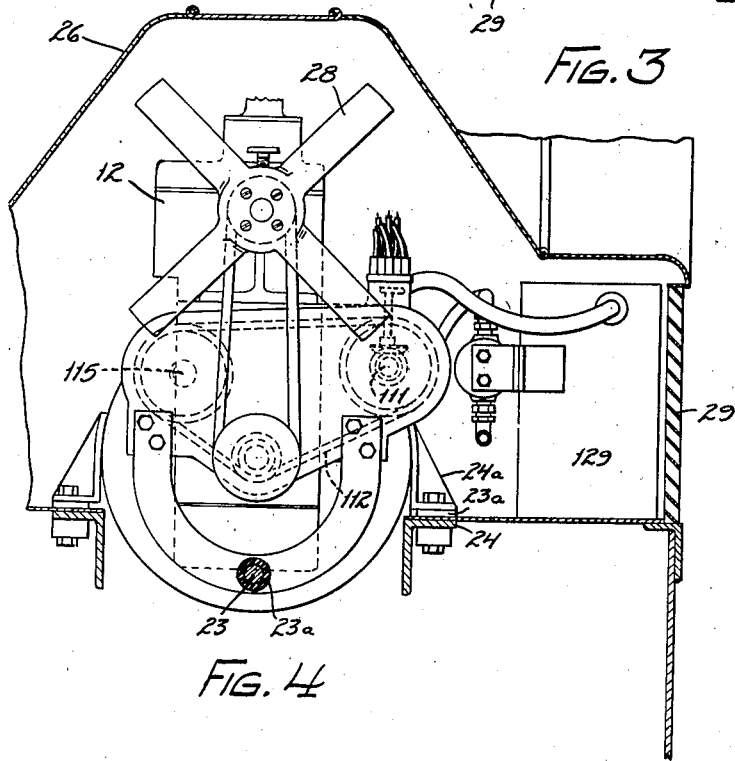
Figures 5, 6, 6A:
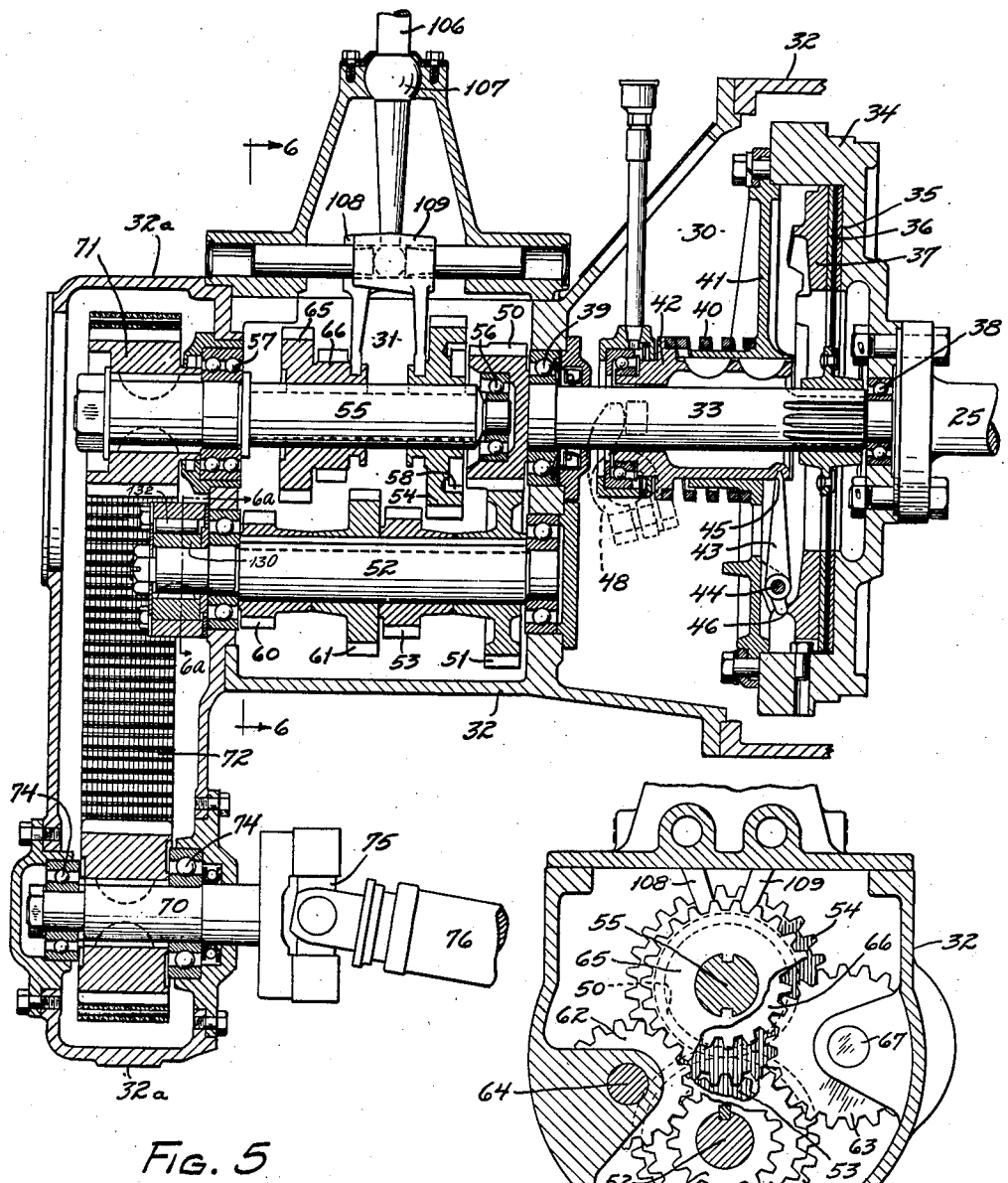
Figure 7:
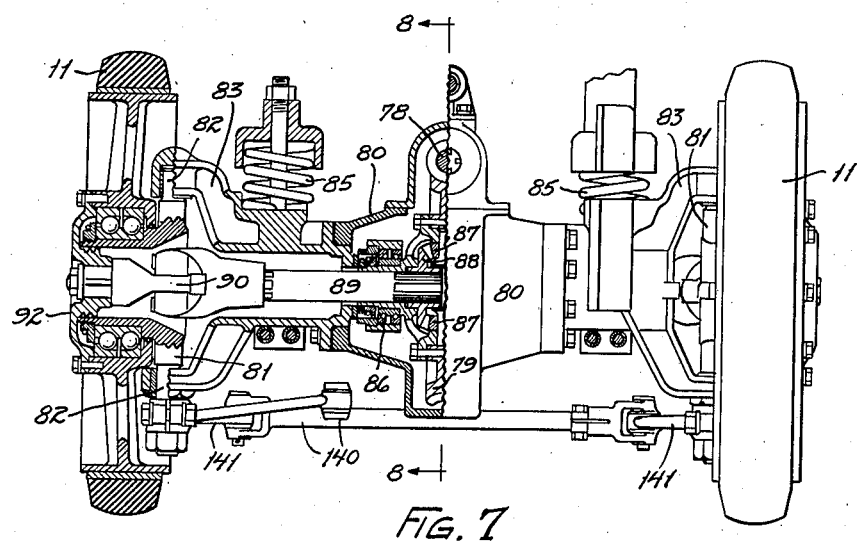
Figure 8:
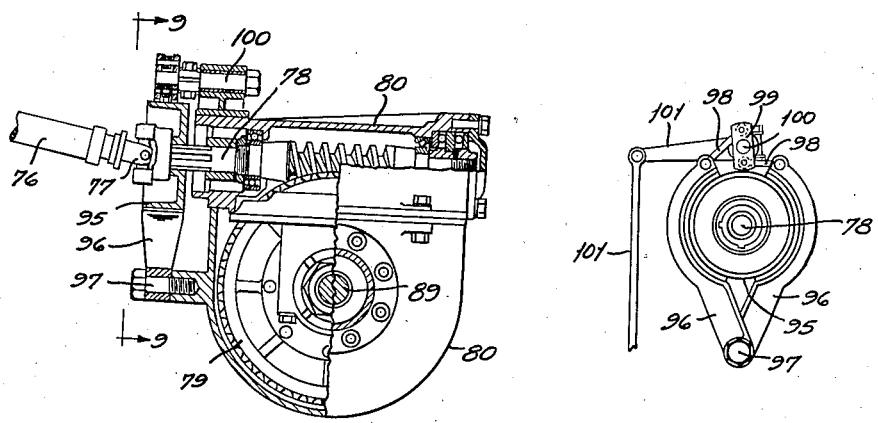
Figure 9:
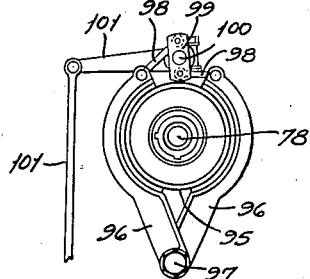

In the drawings, Fig. 1 is a side elevation of an industrial truck embodying my invention; Fig. 2 is a plan view of the truck illustrated in Fig. 1; Fig. 3 is a horizontal section, the plane of the section being indicated by the line 3—3 on Fig. 1; Fig. 4 is a vertical section as indicated by the line 4—4 on Fig. 1; Fig. 5 is a fragmentary section taken through the driving mechanism as indicated by the line 5—5 on Fig. 3; Figs. 6 and 6A are transverse sections, as indicated by the lines 6—6 and 6A—6A on Fig. 5; Fig. 7 is a detailed view, partially in section, of the dirigible driving wheels; Fig. 8 is a sectional detail, the plane of the section being indicated by the line 8—8 on Fig. 7; Fig. 9 is an elevational detail, the plane of the elevation being indicated by the line 9—9 on Fig. 8.

My improved industrial truck, comprises a main frame 10, supported by a pair of dirigible driving wheels 11, and carrying an internal combustion motor 12. The motor is connected with the dirigible driving wheels 11 by a power-transmission mechanism, generally indicated at 14 and a differential driving mechanism 15. The main frame is provided with a rearwardly extending low-slung frame member 16 which is supported adjacent its rearward end by a pair of relatively small load-supporting wheels 17. These wheels are likewise preferably dirigibly arranged, both pairs of wheels being controlled by a suitable steering wheel 18, located adjacent the foremost end of the truck, as illustrated in Fig. 1.

Intermediate the main frame 10 and the low-slung frame member 16 is an upright guideway 19, on which a load-supporting carriage is mounted for vertical movement. The load-supporting carriage is provided with a platform 21, which extends rearwardly from the carriage above the frame extension 16, and is adapted to be lowered into contact therewith to enable the load-supporting surface to be projected beneath a load resting relatively close to the truck-supporting surface, as, for instance, on spaced skid members between which the platform 21 may be projected. At the forward end of the truck is an operator's platform 22, and various control members, including the steering wheel 18, above mentioned.

The motor 12, which is the source of power for the truck, is of the internal combustion type, and may be of the kind generally found in automotive vehicles. The motor is supported by the main frame 10 with its crank shaft 25 extending parallel with and along the longitudinal center line of the truck, and lying in a plane substantially midway between the axis of the wheels 11 and the top of a housing 26, which encloses the motor. At the rear end of the truck, the motor is supported on a horizontal longitudinally extending pivot pin 23 (Fig. 4) which is rigidly secured to the frame 10 in any suitable manner. At the forward end of the truck, the motor is supported by a pair of frame brackets 24 which coact with brackets 24a of the motor. Suitable rubber blocks such as generally indicated at 23a are interposed between the motor and its support to minimize vibrations.

The operator's end of the truck, shown at the left of each assembly drawing is termed the "forward end" of the truck because it is normally foremost when the truck is transporting a load. It is to be noted that the position of the motor and transmission unit is such that the transmission is at the forward end of the truck and the radiator is toward the rear. This construction has several advantages which will hereinafter become more apparent.

The cooling unit for the motor includes the usual radiator 27 and cooling fan 28 these parts being positioned at the rear of the motor. The fan is operated by the motor in the usual manner but is arranged to draw air through louvers 29 in the housing 26 into such housing around the motor and to force the air out of the housing through the radiator toward the rear of the truck. It will be noted that this construction forces the heated air toward the rear of the truck. The forward wall of the motor housing is substantially closed, hence, by drawing the air through the housing there is no tendency for the escaping gases to affect the operator.

As the radiator is adjacent the load engaging member I prefer to utilize a baffle member to protect the radiator from damage caused by inadvertent contact with the load and also to divert the air from the radiator toward the sides of the truck. Such baffle is illustrated in Fig. 3 and, as there shown, comprises a frame 160 of substantially the same area as the radiator. This frame is positioned at the rear of the radiator, that is between the radiator and the upright guide 19. The frame is provided with a series of vertically extending baffle plates 161, those plates which extend toward the right of the truck extending from the radiator rearwardly and toward the right, while these plates at the left extend rearwardly and toward the left. The plates are of such size and spacing as to prevent articles such as rods etc., which might slide forwardly from the load engaging member, from contacting with the radiator. Preferably these plates are tilted about forty five degrees from a vertical plane passing through the longitudinal center of the truck, such angle acting to divert the air currents from the load toward the sides of the truck preventing both damage to the load and back pressures.

The forward end of the crank shaft 25 of the motor 12 is connected to a clutch mechanism 30, which, in turn, is drivingly connected with a change speed transmission mechanism 31. As illustrated in Figs. 1 and 5, the clutch and transmission mechanism are enclosed in a suitable housing 32, which is secured to the motor 12 in any suitable manner. The forward end of the crank shaft 25 of the motor is secured to a fly wheel 34, one face of which is provided with a friction clutch surface 35, arranged to be engaged by a friction clutch surface 36, carried by a spider 37, which is splined to a shaft 33, extending parallel to and in axial alignment with the crank shaft. The shaft 33 is journalled at its rearward end, as at 38, in the fly wheel 34, and at its forward end, as at 39, in the casing 32. The clutch members 35 and 36 are maintained normally in engagement with each other by a compression spring 40, interposed between a spider 41, carried by the fly wheel 34, and a sleeve 42, which is splined to the spider and encircles the shaft 33. The sleeve is provided with a series of notches 45, each of which engages a lever 43, pivoted as at 44 to the spider 41, and bears, as at 46, against the clutch spider 37. Consequent upon the movement of the sleeve 42, by a suitable rock arm 48, against the action of the compression spring 40, the levers 43 are rocked clockwise above their pivots, disengaging them from the spider 37, thereby releasing the pressure between the clutch members 35 and 36. When, however, the rock arm 48 is moved in a counterclockwise direction the spring 40 draws the sleeve toward the left (Fig. 3) causing the levers 43 to reengage the clutch spider 37 and clutch the shaft 33 to the fly wheel 34.

The power transmission mechanism is best shown in Figs. 1 and 5. As there shown, the clutch shaft 33 is provided at its forward end with a gear 50, which is constantly in mesh with a gear 51 secured to a jack shaft 52 which is rotatably journalled in the housing 32 in a plane below and parallel with the clutch shaft 33 and the crank shaft 25. The shaft 52 is provided also with a second gear 53, arranged to be selectively engaged with the external teeth of a compound sliding gear 54. The gear 54 is splined to a shaft 55, which is journalled at one end, as at 56, in a recess formed in the foremost end of the clutch shaft 33, and at the other end, as at 57, in a housing 32a secured in any suitable manner to the housing 32. The gear 54 is provided with a set of internal teeth 58, which, consequent upon the gear being slid toward the right, (Fig. 5) engage the teeth of the gear 50, whereupon the shaft 55 is driven at the same speed as the shaft 33. When, however, the gear member is moved to the left (Fig. 5) into engagement with the gear 53, the shaft 55 is driven at a lower rate of speed than the clutch shaft 33.

Suitable reversing gears are provided in the transmission, so that the direction of movement of the vehicle may be reversed. As shown in Figs. 5 and 6, I secure to the shaft 52 a pair of gears 60 and 61, arranged to constantly mesh with gears 62 and 63, carried by counter shafts 64 and 67, respectively, located at opposite sides of the shaft 52. The gears 62 and 63 are so positioned that they may be selectively engaged by the gears 65 and 66 respectively. The gears 65 and 66 form a compound gear member which is splined to its supporting shaft 55. The arrangement is such that when the gear member is moved in one direction the speed is substantially the same as the speed of the clutch shaft 33, but when moved in the other direction the speed will be considerably less than the speed of the clutch shaft 33.

The shaft 55 of the transmission mechanism drives a shaft 70, which is connected, as will be hereinafter described, to drive the driving wheels 11. As shown in Fig. 5, the foremost end of the shaft 55 extends beyond the housing 32, and has secured thereto a pinion 71 which is connected by drive chain 72 with a pinion. This pinion is drivingly secured to a shaft 70 which is rotatably mounted in suitable bearing members 74 carried by the housing 32a secured to the housing 32. The shaft 70 extends parallel with and below the shaft 55 of the transmission mechanism, and at its rearward end is provided with a universal coupling member 75, which is connected by a shaft 76, Figs. 1, 5 and 8, to a second universal coupling member 77, carried by a worm shaft 78, mounted in the housing 80, which supports the driving wheels 11.

As shown in Fig. 7, each driving wheel 11 is rotatably mounted on a spindle 81, which is pivotally mounted as at 82 in vertically extending pivots carried by bracket members 83 which are integral with the housing 80, heretofore mentioned. This housing is slidably mounted for vertical movement as indicated in Fig. 1, in ways 84, formed in the frame member 10. Suitable springs 85 are interposed between the frame and the housing to resiliently support the frame thereon.

The wheels 11 are driven from the worm shaft 78. As shown in Figs. 7 and 8, the worm of the shaft 78 meshes with a ring gear 79, which is journalled in suitable bearings 86 carried by the housing 80. The ring gear carries a plurality of bevelled pinions 87, constantly in mesh with bevelled gears 88 secured to respective spindles 89, which extend in opposite directions from the ring gear assembly, and each spindle 89 is connected by a universal coupling 90, with a hub member 92, which is secured to the wheels 11 by suitable bolts, thus completing the driving connections from the motor 12 to the dirigible wheels 11.

I prefer to supply the vehicle with an effective brake mechanism, which supplements the braking action of the worm and worm gear 79. As shown in Figs. 8 and 9, I secure to the worm shaft 78 a brake drum 95. Pivotally mounted on the housing 80, as at 97 are a pair of brake arms 96. These brake arms are connected by links 98 to a rock arm 99, which is pivotally mounted on a shaft 100, secured to the housing 80. The brake may be applied consequent upon the operation of links 101.

The brake and clutch mechanisms heretofore described are controlled by a pedal member 105, pivotally mounted in the frame as at 104, overhanging the operator's platform 22, and which is connected to the respective mechanisms by suitable linkage in a manner normally to throw the clutch out and apply the brake as shown in my copending application, Serial No. 76,373 filed April 25th, 1936.

The transmission mechanism is controlled by a shifter lever 106 (Figs. 1 and 3) which is mounted by the usual ball and socket connection 107, on the housing 32, and is arranged to selectively engage shifter forks 108 and 109 to operate the gear members 65 and 54, respectively, in the manner customary in automotive transmissions. The steering wheel is connected in the usual manner to the dirigible wheels by suitable links 140 and spindle arms 141, Fig. 7.

Industrial trucks are sometimes required to operate on comparatively steep inclines and at times are required to come to a stop while on such incline. This is generally accomplished by disengaging the clutch mechanism and applying the brake to the propelling wheels. The truck illustrated in the drawings is provided as heretofore described with a pedal which is connected to cause the disengagement of the clutch and engagement of the brake when the pedal is released by the operator. Such brake, however, is supplemented by an automatically operating anti-coasting mechanism, shown as associated with the transmission, which prevents coasting movement of the truck in either direction opposite the direction determined by the transmission.

The anti-coasting mechanism above mentioned is best illustrated in Figs. 5 and 6A. As there shown, such mechanism in general comprises a roller type clutch, one member 130 of which is secured to the transmission shaft 52 which always rotates in the same direction when driven by the engine, regardless of the direction of travel of the truck. The other member 131 of this clutch is secured to the transmission housing 32. Interposed between the clutch members 130 and 131 are a series of rollers 132. Each roller rests in a recess 133 formed in the member 130 and is normally urged into wedging engagement with the members 130 and 131 by spring-pressed plungers 134. Whenever the shaft 52 is driven by the motor, these rollers are forced against the action of the plungers 134 out of wedging engagement with the clutch members. However, whenever there is a tendency for the truck to coast in a direction opposite to the direction determined by the transmission, the wedging action between the rollers and the clutch members is increased and the rotation of the shaft is prevented. Obviously, this mechanism prevents the clutch shaft from rotating in a different direction than the direction of rotation of the motor crank shaft when the clutch is disengaged, and therefore prevents abnormal strains on the clutch and motor consequent upon reengagement of the clutch when the truck is on an incline.

By arranging the power mechanism as above described, I am able to provide a very compact arrangement, the weight of which is well balanced over the wheels 11. The arrangement likewise provides space at the sides of the motor for a gasoline storage tank 128 and an oil storage tank 129, the former being used for a fuel supply for the motor, and the latter containing an oil supply for a hydraulic hoisting mechanism, the pumping unit of which is generally indicated at 110.

The pumping unit is adapted to be driven by the motor 12. In Fig. 3, I have illustrated the pumping unit as having a drive shaft 111, which is connected, by a suitable power transmission mechanism, such as gears and a drive chain 112, with the front end of the motor, as for instance to the timing shaft 115. The pumping unit is connected by suitable conduits (not shown) with a hydraulic hoisting cylinder unit 113 which acts to raise or lower the carriage 20 together with the load supporting platform 20.

As heretofore mentioned, the carriage is preferably raised or lowered in the guideway 19 by a hydraulically operated mechanism. As indicated in Fig. 1, the carriage is provided with rollers 120, which engage ways 121 formed on the opposite channel members 122 of the vertical guideway 19. One member of the hydraulic hoisting unit is secured to the truck frame, while the other or movable member carries a pair of sprockets around which are looped hoist chains 123, having their opposite ends connected with the truck frame and load lifting carriage respectively.

As heretofore described the change speed transmission unit is at the front of the motor, hence, I am able to mount the truck control mechanism including the transmission control lever 106, the hoisting control levers 116, (which control suitable valves in the conduits between the pumping unit 110 and the hoist unit 113), and throttle and ignition control levers 118 and 117, on or above an inclined dash arrangement 114 which lies above the transmission housing and below the general plane of the motor housing 26. It will thus be seen that when an operator is standing on the platform 22 the various control mechanisms are readily accessible, and are so located that they will not interfere with the movement of the operator, permitting the operator to face either the forward end of the truck or the rearward end of the truck if desired when transporting a load from place to place.

By arranging the motor centrally of the truck, I am able to slope the side panels of the motor housing 26 downwardly from the front to the rear of the vehicle as indicated at 119, Fig. 1, thereby increasing visibility of the operator, especially the visibility of the load-engaging platform 21 during such time as it is being projected beneath the load to raise the same from the supporting surface.

I claim:

1. An industrial lift truck comprising a main frame, a lifting platform supported at the rearward end thereof, lifting means operable to raise and lower the platform relative to the frame, an operator's platform at the forward end of the frame, a pair of dirigible propelling wheels supporting the forward end of the frame, a pair of relatively small-load bearing wheels supporting the rearward end of the frame, a motor mounted on said frame having a uni-directional drive shaft extending longitudinally of the frame, a change speed transmission unit having a driving shaft in axial alignment with the drive shaft of the motor and coupled therewith through the medium of a clutch, a propeller shaft extending longitudinally of the frame and beneath the said driving shaft of the transmission and in substantially the same vertical plane therewith, transmission means connecting the front ends of the driving and propeller shafts, a pair of wheel spindle shafts drivingly connected to said driving wheels and extending in a direction transversely of said truck below said motor, differential gearing connecting said spindles with the propeller shaft, a brake on said propeller shaft, means operated by said motor to operate said lifting means, and a device disposed over said change speed transmission unit for controlling the change speed transmission, means to control the motor and the lifting devices, and means to control the brake and the clutch.

2. An industrial lift truck comprising a main frame, a load lifting member supported at the rearward end thereof, lifting means operable to raise and lower the load lifting member relative to the frame, an operator's platform at the front of said frame, a pair of load bearing wheels supporting the rearward end of said frame, an internal combustion motor mounted on the frame between the load lifting member and the operator's platform and having its crank shaft extending longitudinally of the vehicle and substantially midway between the sides thereof, a clutch shaft in alignment with said crankshaft and extending forwardly therefrom, a bearing carried by the forward end of said crank shaft and supporting the rearward end of said clutch shaft, a selectively operable clutch interposed between said shafts to selectively drive the clutch shaft from the motor shaft, a transmission shaft in alignment with and extending forwardly from said clutch shaft, and journalled in the forward end thereof, a selectively operable change speed transmission mechanism interposed between the clutch shaft and said transmission shaft, a power shaft in vertical alignment with the transmission shaft and disposed therebelow, means drivingly connecting the forward end of the transmission shaft with the forward end of the power shaft, and driving means extending rearwardly from said power shaft and beneath said motor to drive the driving wheels, operating means for said lifting means disposed adjacent one side of the motor, a drive shaft extending parallel with said crankshaft for said operating means, and a driving connection between the rearward end of said motor and said driving shaft, and control means accessible from the operator's platform to control the lifting means, the change transmission, the clutch and the motor.

3. An industrial lift truck comprising a main frame, a lifting platform supported at the rearward end thereof, lifting means operable to raise and lower the platform relative to the frame, an operator's platform at the forward end of the frame, a pair of dirigible propelling wheels supporting the forward end of the frame, a pair of relatively small load-bearing wheels supporting the rearward end of the frame, a motor mounted on said frame having a uni-directional drive shaft extending longitudinally of the frame, a change speed transmission unit forwardly of the motor and having driving and driven shafts in alignment with said uni-directional drive shaft of the motor, a friction clutch interconnecting said driving shafts, a flexible propeller shaft extending longitudinally of the frame and beneath the aforesaid shafts and parallel therewith, chain driving means connecting the driven shaft of the transmission with the propeller shaft, a pair of wheel spindle shafts drivingly connected to said driving wheels and extending transversely of the truck below the motor, differential gearing connecting said spindles with the propeller shaft, means operated by the motor to operate said lifting means, devices disposed above the change speed transmission unit for controlling the same, the motor and the lifting devices, and means operable manually to control the clutch.

4. In an industrial lift truck having a rigid frame including an upright, hollow frame portion at the forward end of the truck supported by driving wheels which are connected with the outer ends of transversely extending differentially operated spindles of a wheel driving mechanism, said truck having a rearwardly disposed low-slung load-carrying frame extension with relatively small supporting wheels thereunder, the combination of an internal combustion engine mechanism mounted in said upright hollow portion of the frame with the crank shaft extending longitudinally of the truck, said mechanism including an automotive type clutch and a change-speed transmission driven thereby and connected with the crank shaft of the engine at the forward end of the truck, and a propeller shaft having a driving connection with the driven element of the transmission, said shaft extending longitudinally rearwardly from said driving connection beneath the crank shaft and being coupled with the wheel driving mechanism to drive said wheels.

5. In an industrial lift truck, in combination, a main frame having a hollow upright forward portion with driving wheels thereunder and a low-slung rearward portion having load-lifting mechanism disposed thereover, the forward portion having an operator's platform extending forwardly at the base thereof, an internal combustion engine mounted in said hollow frame portion with its crank shaft extending longitudinally of the truck inter-connected clutch mechanism and change-speed transmission mechanism operatively connected with the forward end of the crank shaft, control means for the transmission mechanism disposed over the operator's platform in reach of an operator standing thereon, pedal operated control means on the platform operatively connected with the clutch mechanism, a propeller shaft journalled in the hollow forward portion of the frame below the clutch and transmission, one end of the propeller shaft being operatively connected with the driven element of the transmission and the other end being operatively connected with the driving wheels.

6. An industrial lift truck, comprising a main frame having an upright forward portion with driving wheels thereunder and a low-slung rearward portion having load-lifting mechanism disposed thereover, the forward portion having an operator's platform extending forwardly at the base thereof, an internal combustion engine mounted on said upright portion, and having a cooling system including a radiator disposed between the engine and the load, a fan forwardly of the radiator and driven by the engine to force air rearwardly through the radiator, a driving connection between said motor and the driving wheels, and means interposed between the radiator and the load lifting mechanism to direct air passed through the radiator laterally away from a load carried by the lifting mechanism.

7. An industrial lift truck, comprising a main frame having an upright forward portion with driving wheels thereunder and a low-slung rearward portion having load-lifting mechanism disposed thereover, the forward portion having an operator's platform extending forwardly at the base thereof, an internal combustion engine mounted in said upright frame portion with its crank shaft extending longitudinally of the truck, and having a cooling system including a radiator disposed in the rear part of the upright portion of the frame, a fan forwardly of the radiator and driven by the crank shaft to force air rearwardly through the radiator, a clutch and change-speed transmission mechanism operatively connected with the forward end of the crank shaft, a driving connection between said mechanism and the driving wheels, means within reach of the operator standing on the platform to control the transmission clutch and motor, and deflector means associated with the radiator behind the same to divert air passed therethrough by the fan laterally away from a load carried on the lifting mechanism.

8. An industrial lift truck, comprising a main frame having a forward portion in the nature of a hollow upright housing with driving wheels thereunder and a low slung rearward portion having load-lifting mechanism disposed thereover, the forward portion having an operator's platform extending forwardly at the base thereof, an internal combustion engine mounted in said hollow frame portion with its crank shaft extending longitudinally of the truck and having a cooling system including a radiator disposed in the rear part of the housing, air inlet means on the side walls of the housing, a fan forwardly of the radiator and driven by the crank-shaft to force air admitted by said inlet means rearwardly through the radiator, speed reduction means operatively connecting the forward end of the crank shaft with the driving wheels, means within reach of the operator standing on the platform to control the motor and said speed reduction means and deflecting means rearwardly from the radiator to divert part of the air passed therethrough in one direction laterally away from a load on the lifting mechanism, and part in a generally opposite lateral direction.

9. In an industrial lift truck having a rigid frame, including an upright hollow housing at the forward end, supported by dirigible driving wheels and a low-slung load-carrying member at the rearward end thereof, an internal combustion motor mounted in said housing, a clutch mechanism mounted in said housing, means to operate the clutch, a change speed transmission, including a forward-driving gear mechanism and a reverse-driving gear mechanism, means to selectively connect said gear mechanisms with the driving wheels to cause the truck to be selectively propelled in either a forward or rearward direction, a shaft arranged to be driven in one direction by said engine, regardless of the direction of movement of the truck, a connection between said shaft and the driving wheels, and means to prevent movement of said shaft by the wheels when the truck coasts in a direction opposite to the direction determined by the selective connection between the gear mechanism and the driving wheels.

SHELDON K. TOWSON.